(12) United States Patent
Kang et al.

(10) Patent No.: US 7,474,019 B2
(45) Date of Patent: Jan. 6, 2009

(54) PERMANENT MAGNET EXCITED TRANSVERSE FLUX LINEAR MOTOR WITH NORMAL FORCE COMPENSATION STRUCTURE

(75) Inventors: Do Hyun Kang, Changwon-si (KR); Jung Hwan Chang, Changwon-si (KR); Ji Won Kim, Busan (KR); Shi Uk Chung, Changwon-si (KR)

(73) Assignee: Korea Electro Technolgy Research Institute, Gyeongsangnam-do (KR)

( * ) Notice: Subject to any disclaimer, the term of this patent is extended or adjusted under 35 U.S.C. 154(b) by 39 days.

(21) Appl. No.: 11/827,565

(22) Filed: Jul. 12, 2007

(65) Prior Publication Data
US 2008/0024014 A1 Jan. 31, 2008

(30) Foreign Application Priority Data
Jul. 28, 2006 (KR) ...................... 10-2006-0071152

(51) Int. Cl.
*H02K 41/00* (2006.01)
(52) U.S. Cl. ........................................ 310/12
(58) Field of Classification Search ................... 310/12, 310/13, 14
See application file for complete search history.

(56) References Cited
U.S. PATENT DOCUMENTS
4,912,746 A * 3/1990 Oishi ........................... 310/12
6,833,638 B2 * 12/2004 Kang et al. ................... 310/12
6,849,969 B2 * 2/2005 Kang et al. ................... 310/12
7,166,938 B2 * 1/2007 Kang et al. ................... 310/12
7,271,509 B2 * 9/2007 Hoppe et al. .................. 310/12

* cited by examiner

Primary Examiner—Hae Moon Hyeon
(74) Attorney, Agent, or Firm—Frommer Lawrence & Haug LLP; Ronald R. Santucci

(57) ABSTRACT

Disclosed herein is a permanent magnet excited transverse flux linear motor with a normal force compensation structure in which a stator is inserted in the middle of leg portions of a mover so as to compensate normal forces generated between the mover and the stator, thus reducing noise and vibration.

The permanent magnet excited transverse flux linear motor with a normal force compensation structure in accordance with the present invention comprises: a mover including iron cores and permanent magnets, arranged alternately with each other, and a winding coil winding the mover iron cores and the mover permanent magnets; and a stator having an air gap between the mover and itself and arranged longitudinally in the moving direction of the mover, wherein the mover iron cores and the mover permanent magnets are formed in the shape of "⊓", of which both leg portions and middle portions are arranged in a straight line, the winding coil winds the both leg portions of the mover iron cores and the mover permanent magnets in the shape of "⊓", respectively, and an iron core of the stator having a concave-convex shape, in which a plurality of projections formed along the length of a central portion and projected from the central portion to the left and right sides alternately, is arranged to be inserted in the middle of the both leg portions of the mover iron cores and the mover permanent magnets.

12 Claims, 4 Drawing Sheets

PERMANENT MAGNET EXCITED TRANSVERSE FLUX LINEAR MOTOR WITH NORMAL FORCE COMPENSATION STRUCTURE

CROSS-REFERENCE TO RELATED APPLICATION

This application claims the benefit of Korean Patent Application No. 10-2006-0071152 filed on Jul. 28, 2006, the entire disclosure of which is hereby incorporated by reference.

BACKGROUND OF THE INVENTION

1. Field of the Invention

The present invention relates to a permanent magnet excited transverse flux linear motor and, more particularly, to a permanent magnet excited transverse flux linear motor with a normal force compensation structure in which a stator is inserted in the middle of leg portions of a mover so as to compensate normal forces generated between the mover and the stator, thus reducing noise and vibration.

2. Description of Related Art

In general, a motor is a device that converts electrical energy into mechanical energy and fundamentally requires a high output power (output power/motor weight: kW/kg) and a high efficiency (output power/input power).

Especially, in a case where linear motion is obtained using a power transmission system such as a rotary motor, a ball screw, etc., the system becomes complicated and produces particles and dusts, thus it cannot form a clean transfer system. Accordingly, the use of linear motors has been increased recently in linear transmission systems.

The linear motors may be classified into a longitudinal flux motor and a transverse flux motor according to the direction of a magnetic flux.

Here, the direction of the magnetic flux is the same as the moving direction of the motor in the longitudinal flux motor, whereas, the direction of the magnetic flux is transverse to the moving direction of the motor in the transverse flux motor.

That is, in case of the longitudinal flux motor, the direction of an applied current is perpendicular to the moving direction of the motor, whereas, in case of the transverse flux motor, the direction of an applied current is the same as the moving direction of the motor.

In the transverse flux motor, a space (electrical circuit) in which a winding can be performed is separated from a space (magnetic circuit) in which a magnetic flux can flow. Accordingly, the transverse flux motor can increase the output power density and provide a variety of designs, compared with the longitudinal flux motor in which the electrical circuit and the magnetic circuit are coupled with each other.

Moreover, the transverse flux motor has advantages in that the copper loss is small and the amount of copper used therein is small, since the winding is provided in the form of a ring, compared with the longitudinal flux motor having a lot of end-windings.

Meanwhile, as well known in the art, since a linear motor is large in volume and uses many permanent magnets, the size of the system is large and its price is high.

To solve such problems, it is possible to use permanent magnet excited transverse flux linear motors that generate a high thrust force per unit weight and require a smaller number of expensive permanent magnets.

However, it has been known that the existing permanent magnet excited transverse flux linear motors have numerous limitations in their use due to noise and vibration caused by the normal forces and the pulsation of the thrust force.

Especially, since the permanent magnet excited transverse flux linear motor has a structure in which the mover faces the stator and the left and right normal forces are applied to the mover and stator structure, large normal forces are generated to cause noise and vibration.

Accordingly, it is necessary to provide an improved method of reducing the noise and vibration by compensating the normal forces in the permanent magnet excited transverse flux linear motor.

Moreover, since the magnetic flux of the existing permanent magnet excited transverse flux linear motor flows three dimensionally, an ordinary laminated iron core cannot be used, therefore a solid iron core is used. However, in a case where the solid iron core is employed, the motor performance deteriorates, and the deterioration becomes severe due to iron loss in a high speed range.

SUMMARY OF THE INVENTION

Accordingly, the present invention has been made in an effort to solve the above-described drawbacks, and an object of the present invention is to provide a permanent magnet excited transverse flux linear motor with a normal force compensation structure in which a stator is inserted in the middle of leg portions of a mover so as to compensate normal forces generated between the mover and the stator, thus reducing noise and vibration.

Moreover, another object of the present invention is to provide a permanent magnet excited transverse flux linear motor that can reduce iron loss using a laminated iron core or a powdered iron core as a stator iron core.

In an aspect, the present invention provides a permanent magnet excited transverse flux linear motor with a normal force compensation structure comprising: a mover including iron cores and permanent magnets, arranged alternately with each other, and a winding coil winding the mover iron cores and the mover permanent magnets; and a stator having an air gap between the mover and itself and arranged longitudinally in the moving direction of the mover, wherein the mover iron cores and the mover permanent magnets are formed in the shape of "∩" of which both leg portions and middle portions are arranged in a straight line, the winding coil winds the both leg portions of the mover iron cores and the mover permanent magnets in the shape of "∩", respectively, and an iron core of the stator having a concave-convex shape, in which a plurality of projections formed along the length of a central portion and projected from the central portion to the left and right sides alternately, is arranged to be inserted in the middle of the both leg portions of the mover iron cores and the mover permanent magnets.

Preferably, in the iron core of the stator, the projections, which projected to the left and right sides alternately, are repeatedly formed at intervals of "$\tau_P$", which is a pole pitch of the mover, and thereby adjacent projections in the same side are arranged to be repeated at intervals of "$2\tau_P$".

Suitably, the iron core of the stator has a laminated structure in which iron plates are laminated in a plurality of layers.

Moreover, the iron core of the stator is a powdered iron core formed by molding iron powder.

Furthermore, each of the mover iron cores features a powdered iron core formed by molding iron powder.

In another aspect, the present invention provides a permanent magnet excited transverse flux linear motor with a normal force compensation structure comprising: a mover including iron cores and permanent magnets, arranged alternately with each other, and a winding coil winding the mover iron cores and mover the permanent magnets; and a stator having an air gap between the mover and itself and arranged longitudinally in the moving direction of the mover, wherein the mover iron cores and the mover permanent magnets are formed in the shape of "∩" of which both leg portions and middle portions are arranged in a straight line, the winding coil winds the both leg portions of the mover iron cores and the mover permanent magnets in the shape of "∩", respectively, and an iron core of the stator having a skewed structure, in which a plurality of projections are arranged at predetermined intervals on the top of a base along the longitudinal direction thereof to be skewed on the top surface of the base, is arranged to be inserted in the middle of the both leg portions of the mover iron cores and the mover permanent magnets.

Preferably, in the iron core of the stator, a pitch between left and right ends of each of the projections is arranged to be skewed by "$\tau_P$", which is a pole pitch of the mover, and such projections are arranged to be repeated at intervals of "$2\tau_P$" along the length of a base thereof.

Suitably, the iron core of the stator features a powdered iron core formed by molding iron powder.

In a further aspect, the present invention provides a permanent magnet excited transverse flux linear motor with a normal force compensation structure comprising: a mover including iron cores and permanent magnets, arranged alternately with each other, and a winding coil winding the mover iron cores and the mover permanent magnets; and a stator having an air gap between the mover and itself and arranged longitudinally in the moving direction of the mover, wherein the mover iron cores and the mover permanent magnets are formed in the shape of "∩" having leg portions and skewed by a pole pitch of "$\tau_P$", the winding coil winds the both leg portions of the mover iron cores and the mover permanent magnets in the shape of "∩", respectively, and an iron core of the stator including a plurality of projections arranged at predetermined intervals on the top of a base along the longitudinal direction thereof is arranged to be inserted in the middle of the both leg portions of the mover iron cores and the mover permanent magnets.

Preferably, in the iron core of the stator, the respective projections are arranged perpendicularly to the moving direction of the mover, and the plurality of such projections are arranged to be repeated at intervals of "$2\tau_P$".

Suitably, the iron core of the stator is a powdered iron core formed by molding iron powder.

Moreover, each of the mover iron cores is a powdered iron core formed by molding iron powder.

DETAILED DESCRIPTION OF THE INVENTION

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

The present invention provides a permanent magnet excited transverse flux linear motor with a normal force compensation structure in which the shapes of a mover and a stator are improved and, at the same time, the position of the stator is changed so as to compensate normal forces generated between the mover and the stator, thus reducing noise and vibration.

Conventional permanent magnet excited transverse flux linear motors have a structure in which mover iron cores and mover permanent magnets are skewed from each other by a pole pitch of "$\tau_P$". Moreover, since the magnetic flux of the conventional permanent magnet excited transverse flux linear motor flows three dimensionally as well known in the art, an ordinary laminated iron core cannot be used, thus a solid iron core is used. However, in a case where the solid iron core is employed, the motor performance deteriorates and the deterioration becomes severe due to iron loss in a high speed range.

Figure 1:
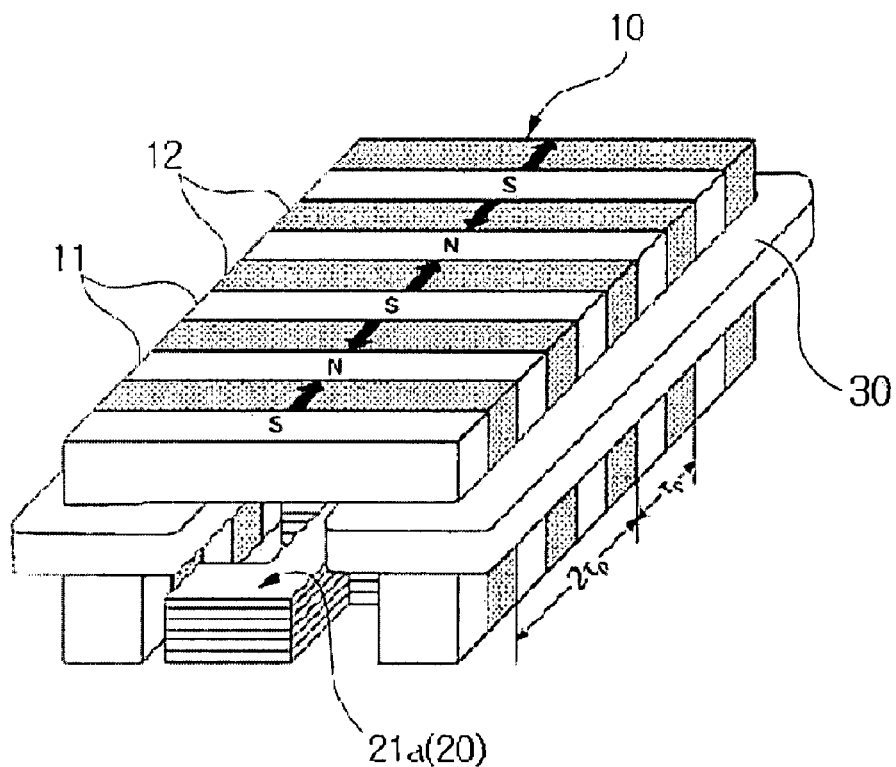
FIG. 1 is a perspective view showing a mover and a stator of a permanent magnet excited transverse flux linear motor in accordance with a preferred embodiment of the present invention.

Accordingly, in the permanent magnet excited transverse flux linear motor in accordance with the present invention, the stator is positioned in the middle of the mover to compensate normal forces generated between the stator and the mover, thus reducing noise and vibration, as shown in FIG. 1.

Moreover, the present invention provides a permanent magnet excited transverse flux linear motor that can reduce iron loss using a laminated iron core having a concave-convex shape or a powdered iron core as a stator iron core and facilitate the manufacturing process of movers by arranging mover iron cores and mover permanent magnets in a straight line.

FIG. 1 is a perspective view showing a mover and a stator of a permanent magnet excited transverse flux linear motor with a normal force compensation structure in accordance with a preferred embodiment of the present invention.

A mover 10 comprises mover iron cores 11 and mover permanent magnets 12 in the shape of "∩", of which both leg portions and middle portions are arranged in a straight line, and a winding coil 30 including coils winding the both leg portions of the mover iron cores 11 and the mover permanent magnets 12 in the shape of "∩" respectively, as shown in FIG. 1, differently from the conventional iron cores and permanent magnets.

The mover permanent magnets 12 are inserted between the mover iron cores 11, in which the magnetic poles of adjacent mover permanent magnets 12 along the mover iron core 11 are arranged in the opposite direction, i.e., in the order of ← and → alternately as shown in FIG. 1. Accordingly, the magnetic poles of N and S are generated alternately in the motor iron cores 11.

In a preferred embodiment of the present invention, a laminated stator iron core 20 having a concave-convex shape is used as the stator arranged longitudinally in the moving direction of the mover 10.

Figure 2:
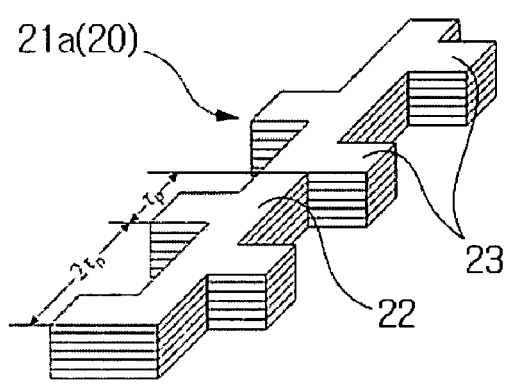
FIG. 2 is a perspective view showing an example of a laminated stator iron core of the permanent magnet excited transverse flux linear motor shown in FIG. 1 in accordance with the preferred embodiment of the present invention.

In more detail, FIG. 2 is a perspective view showing the laminated stator iron core 20 in accordance with the preferred embodiment of the present invention, wherein a stator iron core 21a has a laminated structure in which iron plates are laminated in a plurality of layers to reduce the iron loss.

Moreover, the laminated stator iron core 21a has the concave-convex shape, in which a plurality of projections 23 is formed to be projected along the length of a central portion 22. Here, the projections 23 are projected from the central portion 22 to the left and right sides alternately.

The laminated stator iron core 21a having the above-described concave-convex shape is arranged in the middle of the inside of the mover iron cores 11 and the mover permanent magnets 12 in the shape of "∩" and, more precisely, is arranged in the middle of both leg portions of the mover iron cores 11 and the permanent magnets 12 as shown in FIG. 1.

Referring to FIG. 2, the left and right teeth of the laminated stator iron core 21a, i.e., the left and right projections 23 are arranged to be skewed from each other by a pole pitch of "$\tau_P$" of the mover 10 in FIG. 1 so that a thrust force generated in an air gap between the mover and the stator is forwarded to the direction to move.

In other words, the projections 23 projected to the left and right sides are repeatedly formed at intervals of "$\tau_P$", which is a pole pitch of the mover 10 in FIG. 1, that is, the left and right projections 23 are repeatedly formed in a cycle of "$\tau_P$". Accordingly, the adjacent projections 23 in the same side are arranged to be repeated at intervals of "$2\tau_P$".

According to the linear motor configured as shown in FIGS. 1 and 2, since the stator iron core 21a having the concave-convex shape is arranged in the middle of the leg portions of the mover iron cores 11 and the permanent magnets 12, normal forces generated between the mover 10 and the stator 20 can be compensated with each other, thus reducing noise and vibration.

Moreover, as the linear motor of the present invention applies the stator iron core 21a having the concave-convex shape in which the projections 23 are arranged by a pole pitch of "$\tau_P$" to the left and right sides alternately, the thrust force in the air gap can be generated in the direction to move, even though the mover iron cores 11 and the mover permanent magnets 12 are arranged in a straight line. Accordingly, it is possible to manufacture the mover iron cores and the permanent magnets more readily with the straight line structure.

Furthermore, as the laminated stator iron core 21a is used, it is possible to reduce the iron loss compared with the used of the solid iron core.

Figure 3:
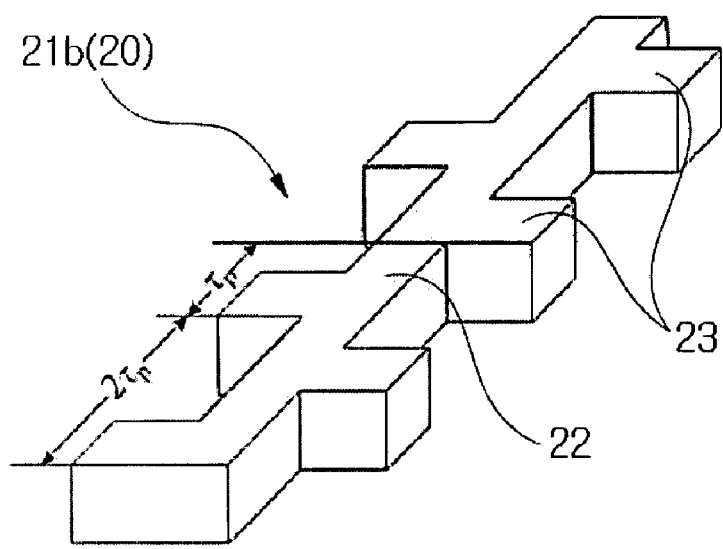
FIG. 3 is a perspective view showing an example of a stator iron core formed in a solid type which can be used in the linear motor in accordance with the present invention.

FIG. 3 is a perspective view showing another example of a stator iron core which can be used in the linear motor in accordance with the present invention, in which the stator iron core 21b having the same shape as the laminated stator iron core but formed in a solid type is shown.

If the solid stator iron core 21b is arranged to replace the laminated stator iron core 21a shown in FIG. 1, that is, if the solid stator iron core 21b is arranged in the middle of the leg portions of the mover iron cores 11 and the mover permanent magnets 12, the normal forces can be compensated with each other to reduce noise and vibration. Such a solid stator iron core 21b is applicable to a case where the stator is required to have a solid structure at low speed.

Moreover, a powdered iron core manufactured using iron powder in the same shapes as the laminated stator iron core 21a and the solid stator iron core 21b respectively shown in FIGS. 2 and 3, can be applied. Accordingly, it is possible to apply the powdered iron core in the same concave-convex shape to reduce the iron loss at high speed.

As well known in the art, the powdered iron core is manufactured by press-molding iron powder in a mold and sintering the molded iron power. When using such manufacturing process, it is possible to manufacture the iron cores with complex and varied shapes.

Moreover, it is also possible to manufacture the mover iron cores 11 using the iron powder so as to reduce the iron loss in the permanent magnet excited transverse flux linear motor of the present invention.

Figure 4:
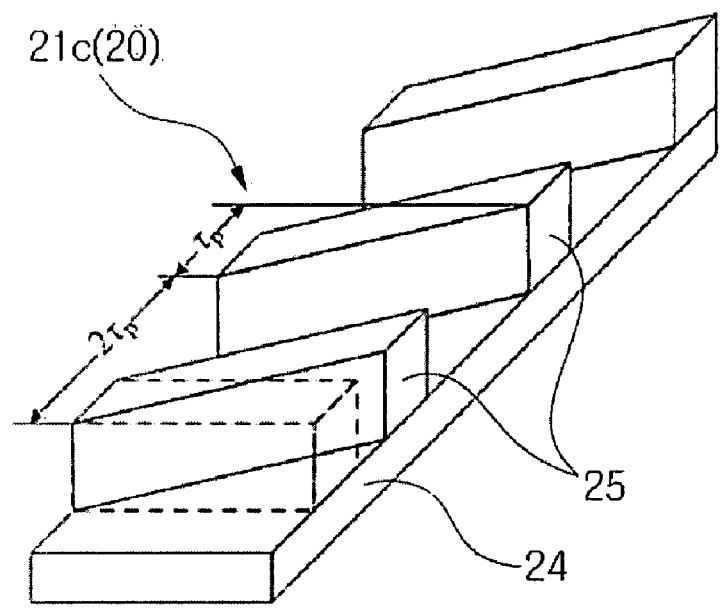
FIG. 4 is a perspective view showing another example of the stator iron core which can be used in the linear motor in accordance with the present invention.

FIG. 4 is a perspective view showing another example of a stator iron core which can be used in the linear motor in accordance with the present invention, in which the stator iron core 21c formed integrally with a plurality of projections 25 arranged at predetermined intervals on the top of a base 24 along the longitudinal direction thereof is shown.

In the stator iron core 21c shown in the figure, the projections 25 are arranged to be projected upward on the top surface of the base 24 and, at the same time, to be skewed on the top surface of the base 24 so that the pitch between left and right ends becomes a pole pitch of "$\tau_P$" of the mover.

That is, the teeth on the left and right sides in the stator iron core 21c are skewed by a pole pitch of "$\tau_P$".

The projections 25 corresponding to the teeth of the stator iron core 21c are arranged repeatedly at intervals of "$2\tau_P$" in the longitudinal direction of the stator iron core 21c (or the base 24), i.e., in the moving direction of the mover.

The solid stator iron core 21c having the skewed shape as described above is arranged to be inserted in the middle of the inside of the mover iron cores 11 and the mover permanent magnets 12 in the shape of "∩", i.e., in the middle of the both leg portions of the mover iron cores 11 and the mover permanent magnets 12 in the same manner as the stator iron cores 21a and 21b, respectively shown in FIGS. 2 and 3.

The manufacturing process of the solid stator iron core 21c having the skewed shape is more simplified than the solid stator iron core 21b having the concave-convex shape shown in FIG. 3. Moreover, it is possible to apply a powdered iron core 21c having the shape of FIG. 4 in order to reduce the iron loss at high speed.

Figure 5:
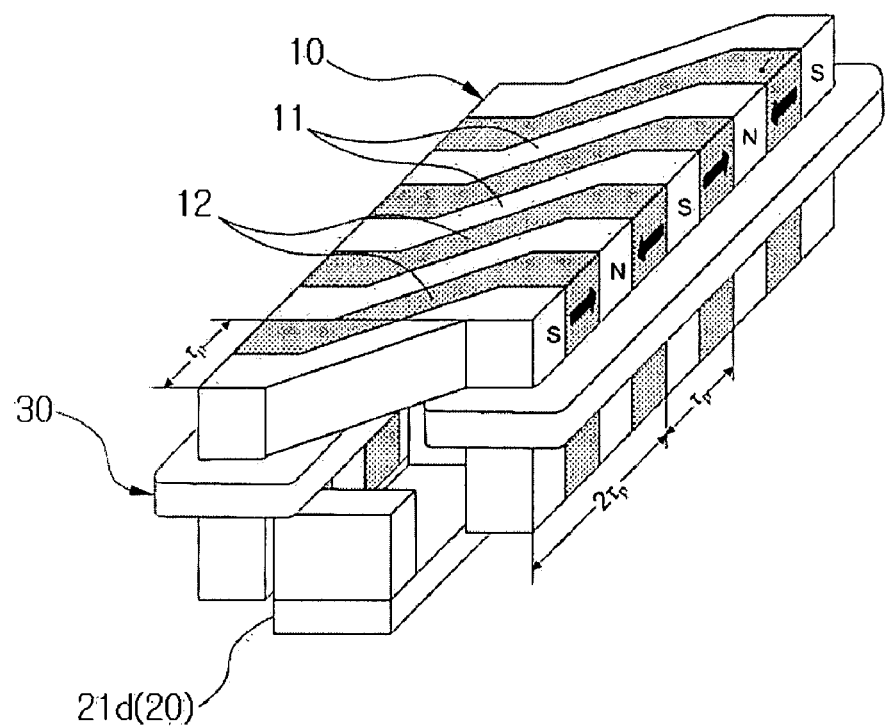
FIG. 5 is a perspective view showing a mover and a stator of a permanent magnet excited transverse flux linear motor in accordance with another embodiment of the present invention.

FIG. 5 is a perspective view showing a mover and a stator of a permanent magnet excited transverse flux linear motor in accordance with another embodiment of the present invention.

As shown in the figure, the mover iron cores 11 and the mover permanent magnets 12 are formed in the shape of "∩" having leg portions and skewed by a pole pitch of "$\tau_P$".

In the present embodiment, the mover 10 has a skewed structure, differently from the embodiment of FIG. 1, and the stator iron core 21a is arranged to be inserted in the middle of both leg portions of the mover iron cores 11 and the mover permanent magnets 12 and with left and right air gaps.

As shown in FIG. 5, the mover iron cores 11 and the mover permanent magnets 12 have the skewed structure in which the pitch between left and right ends becomes a pole pitch of "$\tau_P$" of the mover. The mover permanent magnets 12 are inserted between the mover iron cores 11, in which the magnetic poles of adjacent mover permanent magnets 12 along the mover iron core 11 are arranged in the opposite direction, i.e., in the order of ← and → alternately as shown in FIG. 5. Accordingly, the magnetic poles of N and S are generated alternately in the mover iron cores 11.

The winding core 30 comprises separate coils winding the both leg portions of the mover iron cores 11 and the mover permanent magnets 12 in the shape of "∩".

Figure 6:
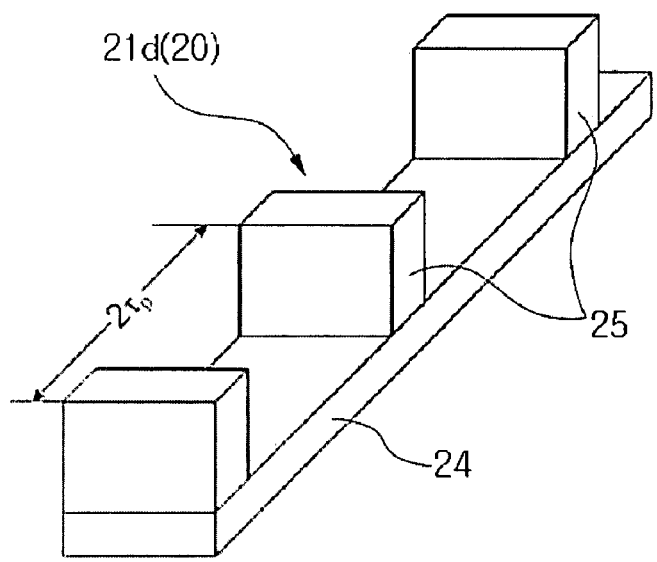
FIGS. 6 and 7 are perspective views showing stator iron cores which can be applied to the embodiment of FIG. 5.
Figure 7:
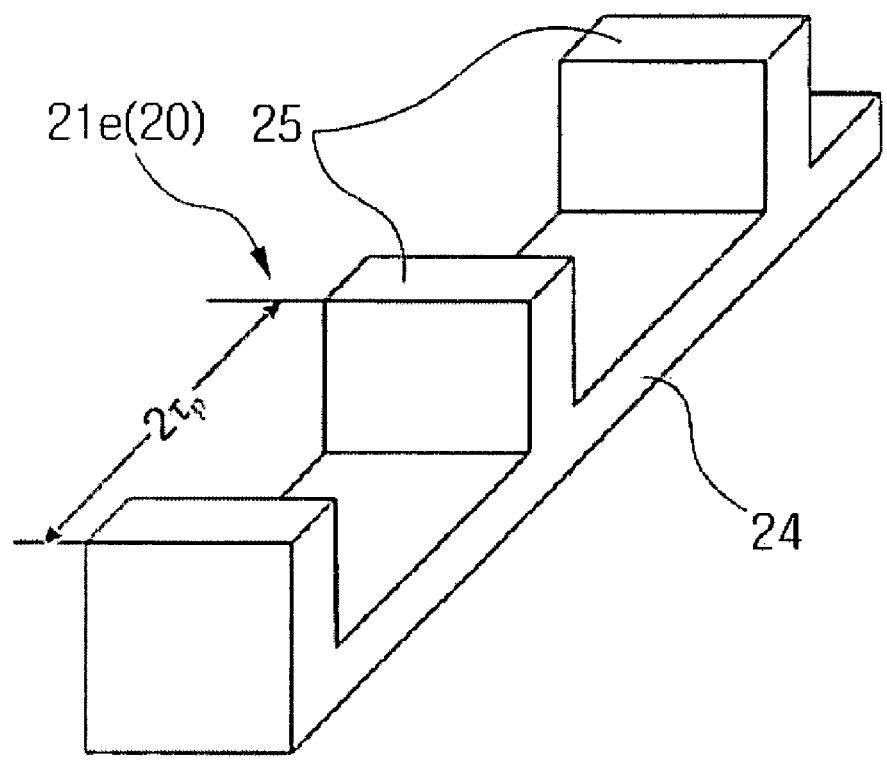

FIGS. 6 and 7 are perspective views showing stator iron cores which can be applied to the embodiment of FIG. 5, in which examples of stator iron cores 21d and 21e formed integrally with a plurality of projections 25 arranged at predetermined intervals on the top of a base 24 along the longitudinal direction thereof are shown.

In the stator iron cores 21d and 21e shown in the figures, the projections 25 are arranged to be projected upward on the top surface of the 20 base 24, and the respective projections 25 are arranged perpendicularly to the moving direction of the mover (perpendicularly to the longitudinal direction of the base 24) on the top surface of the base 24. Moreover, the projections 25 as described above are arranged repeatedly at intervals of "$2\tau_P$" in the longitudinal direction of the stator iron cores 21d and 21e, i.e., in the moving direction of the mover.

As described above, since the mover 10 in FIG. 5 is formed to be skewed by a pole pitch of "$\tau_P$" and the teeth (projections) of the stator iron cores 21d and 21e arranged in the middle of the leg portions of the mover are provided in a straight line, the mover can be moved back and forth along the longitudinal direction of the stator iron cores 21d and 21e by the thrust force generated in an air gap between the mover and the stator.

The linear motor in FIG. 5 has the structure of the mover and the stator similar to the structure of the linear motor in FIG. 1, which the stator 20 is arranged in the middle of the leg portions of the mover 10, so that the normal forces generated between the mover and the stator may be compensated with each other, thus reducing noise and vibration.

Moreover, it is also possible to manufacture the mover iron cores using the iron powder in the same manner as the embodiment of FIG. 1.

FIG. 6 shows the stator iron core 21d formed in such a manner that the projections 25 corresponding to the teeth are formed separately and then attached integrally to the base 24 in the permanent magnet excited transverse flux liner motor having the mover formed in the skewed shape.

Like this, the processing cost can be saved if the projections 25 are formed separately and then attached integrally to the base 24 to manufacture one stator iron core 21d.

Moreover, a powdered iron core having the same shape as FIG. 6 can be applied to reduce the iron loss at high speed.

FIG. 7 shows the stator iron core 21e formed integrally in the permanent magnet excited transverse flux liner motor having the mover formed in the skewed shape.

The stator iron core 21e formed integrally, i.e., the solid stator iron core, is suitable for a case where the stator is required to have a strong solid structure.

Of course, a powdered iron core having the same shape as FIG. 7 can be applied to reduce the iron loss at high speed.

As described above, according to the permanent magnet excited transverse flux linear motor of the present invention, the stator is arranged to be inserted in the middle of the leg portions of the mover to compensate the normal forces generated between the mover and the stator, thus reducing noise and vibration.

Moreover, according to the present invention, the laminated iron core or the powdered iron core is used as the stator iron core to reduce the iron loss.

Furthermore, it is possible to use the mover iron cores and the mover permanent magnets arranged in a straight line by employing the concave-convex structure in which the projections are arranged to be projected to the left and right sides alternately or the skewed structure in which the projections are skewed, thus manufacturing the movers more readily.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A permanent magnet excited transverse flux linear motor with a normal force compensation structure comprising: a mover including iron cores and permanent magnets, arranged alternately with each other, and a winding coil winding the mover iron cores and the mover permanent magnets; and a stator having an air gap between the mover and itself and arranged longitudinally in the moving direction of the mover, wherein the mover iron cores and the mover permanent magnets are formed in the shape of "∩", of which both leg portions and middle portions are arranged in a straight line, the winding coil winds the both leg portions of the mover iron cores and the mover permanent magnets in the shape of "∩", respectively, and an iron core of the stator having a concave-convex shape, in which a plurality of projections formed along the length of a central portion and projected from the central portion to the left and right sides alternately, is inserted in the middle of the both leg portions of the mover iron cores and the mover permanent magnets.

2. The permanent magnet excited transverse flux linear motor with a normal force compensation structure as recited in claim 1, wherein, in the iron core of the stator, the projections projected to the left and right sides alternately are repeatedly formed at intervals of "$\tau_P$", which is a pole pitch of the mover, and thereby adjacent projections in the same direction are repeated at intervals of "$2\tau_P$".

3. The permanent magnet excited transverse flux linear motor with a normal force compensation structure as recited in claim 1, wherein the iron core of the stator has a laminated structure in which iron plates are laminated in a plurality of layers.

4. The permanent magnet excited transverse flux linear motor with a normal force compensation structure as recited in claim 1, wherein the iron core of the stator is a powdered iron core formed by molding iron powder.

5. The permanent magnet excited transverse flux linear motor with a normal force compensation structure as recited in claim 1, wherein each of the mover iron cores is a powdered iron core formed by molding iron powder.

6. A permanent magnet excited transverse flux linear motor with a normal force compensation structure comprising: a mover including iron cores and permanent magnets, arranged alternately with each other, and a winding coil winding the mover iron cores and mover the permanent magnets; and a stator having an air gap between the mover and itself and arranged longitudinally in the moving direction of the mover, wherein the mover iron cores and the mover permanent magnets are formed in the shape of "∩", of which both leg portions and middle portions are arranged in a straight line, the winding coil winds the both leg portions of the mover iron cores and the mover permanent magnets in the shape of "∩", respectively, and an iron core of the stator having a skewed structure, in which a plurality of projections are arranged at predetermined intervals on the top of a base along the longitudinal direction thereof and skewed on the top surface of the base, is inserted in the middle of the both leg portions of the mover iron cores and the mover permanent magnets.

7. The permanent magnet excited transverse flux linear motor with a normal force compensation structure as recited in claim 6, wherein, in the iron core of the stator, a pitch between left and right ends of each of the projections is skewed by "$\tau_P$", which is a pole pitch of the mover, and such projections are repeated at intervals of "$2\tau_P$" along the length of a base thereof.

8. The permanent magnet excited transverse flux linear motor with a normal force compensation structure as recited in claim 6, wherein the iron core of the stator is a powdered iron core formed by molding iron powder.

9. A permanent magnet excited transverse flux linear motor with a normal force compensation structure comprising: a mover including iron cores and permanent magnets, arranged alternately with each other, and a winding coil winding the mover iron cores and the mover permanent magnets; and a stator having an air gap between the mover and itself and arranged longitudinally in the moving direction of the mover, wherein the mover iron cores and the mover permanent magnets are formed in the shape of "∩" having leg portions and skewed by a pole pitch of "$\tau_P$", the winding coil winds the both leg portions of the mover iron cores and the mover permanent magnets in the shape of "∩", respectively, and an iron core of the stator including a plurality of projections arranged at predetermined intervals on the top of a base along the longitudinal direction thereof is inserted in the middle of the both leg portions of the mover iron cores and the mover permanent magnets.

10. The permanent magnet excited transverse flux linear motor with a normal force compensation structure as recited in claim 9, wherein, in the iron core of the stator, the respective projections are arranged perpendicularly to the moving direction of the mover and the plurality of such projections are repeated at intervals of "$2\tau_P$".

11. The permanent magnet excited transverse flux linear motor with a normal force compensation structure as recited in claim 9, wherein the iron core of the stator is a powdered iron core formed by molding iron powder.

12. The permanent magnet excited transverse flux linear motor with a normal force compensation structure as recited in claim 9, wherein each of the mover iron cores is a powdered iron core formed by molding iron powder.

* * * * *